July 11, 1967

J. CULLIS, JR 3,330,614

LENTICULAR OPTICAL DISPLAY DEVICE HAVING
MASKING MEANS FOR ELIMINATING CROSSTALK
Original Filed Nov. 23, 1962

INVENTOR.
JOHN CULLIS JR.
BY Robert A. Green
ATTORNEY 3,330,614
LENTICULAR OPTICAL DISPLAY DEVICE HAVING MASKING MEANS FOR ELIMINATING CROSSTALK
John Cullis, Jr., Bridgewater Township, N.J., assignor to Burroughs Corporation, Detroit, Mich., a corporation of Michigan
Continuation of application Ser. No. 239,564, Nov. 23, 1962. This application Mar. 22, 1966, Ser. No. 542,706
2 Claims. (Cl. 350—167)

This is a continuation of application Ser. No. 239,564, filed Nov. 23, 1962, now abandoned.

This invention relates to optical display devices and particularly to optical display devices adapted to present a plurality of separate messages or characters.

One type of optical display device to which the principles of the invention relate is known as a lenticular device and is shown in U.S. Patent No. 2,981,140. This type of device includes a lens assembly comprising a large number of tiny lenses which are adapted to receive and focus light from a plurality of small lamps which can be separately energized. The lens assembly also carries a plurality of separate messages on a photographic film. Each lamp may be switched on to select and display one of the recorded messages.

A device of this type is subject to the problem of crosstalk, which means that messages other than a selected message may be visible at the same time because of the spreading of light rays, with the resultant energization of a plurality of message areas at the same time.

Accordingly, the objects of the present invention concern the provision of an improved lenticular optical display device which can display a plurality of separate messages and which has negligible crosstalk between messages.

Briefly, an optical display device embodying the invention includes a plurality of light sources and a lens body spaced from and adapted to receive light from the light sources. The lens body has a first surface which carries a plurality of small lenses and a second surface which carries a plurality of message elements, each of which is adapted to be energized by light passing through the lenses from a separate one of the lamps. In order to eliminate a serious source of spurious light which comprises the primary cause of crosstalk, an opaque mask is positioned between and surrounding each of the small lenses on the lens body.

Figure 1:
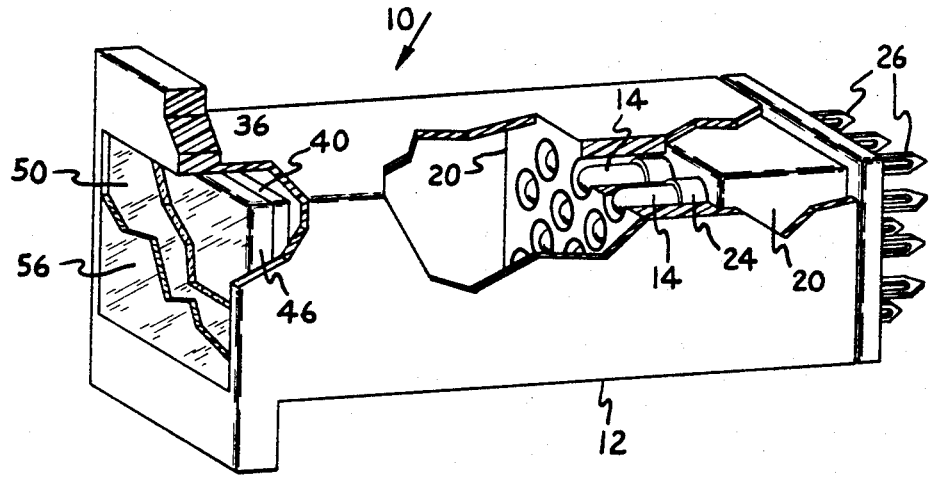
Figure 2:
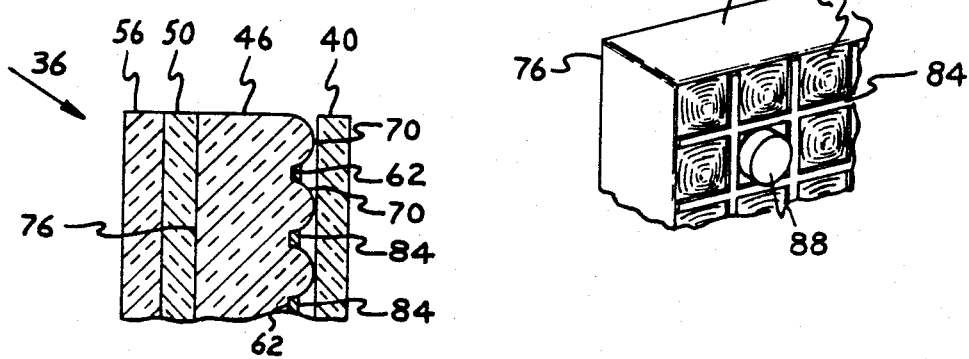
Figure 3:
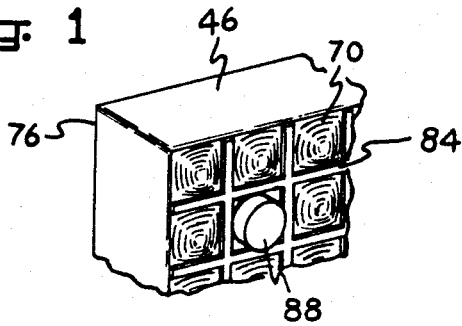
Figure 4:
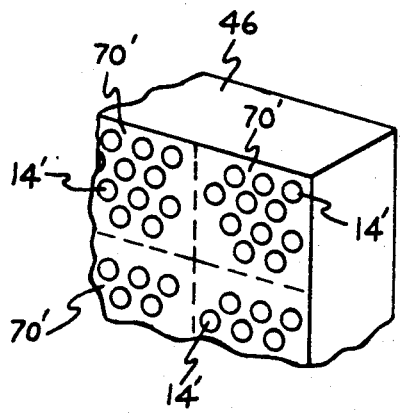

In the drawing:
FIG. 1 is a perspective view, partly in section, of a display device embodying the invention;
FIG. 2 is a sectional view of a portion of the device of FIG. 1;
FIG. 3 is a perspective view of a portion of the structure shown in FIG. 2; and
FIG. 4 is a perspective view from a different angle of the structure of FIG. 3.

Referring to the drawing, an optical device 10 embodying the invention includes a tubular container 12 of insulating material, for example, a synthetic resinous material, which carries at one end an array of light-producing devices such as incandescent lamps 14. One lamp is provided for each message to be displayed, and, if, for example, the device is adapted to display numerals "0" to "9" and a decimal point, then eleven lamps are provided. The lamps are of small size and may be mounted on any suitable base 20, for example, a block of synthetic resinous material which carries suitable lamp sockets 24 having terminals 26 accessible at the rear of the block. The block is designed to provide light-tight engagement with one end of the tubular container 12.

At the opposite end of the tubular container and in light-tight engagement therewith is positioned a message assembly 36 (FIG. 2) comprising a sandwich of elements including a Fresnel lens 40, a lenticular lens body 46, a message carrier 50, and a light-diffusing element 56, in that order. The Fresnel lens functions as a collimating lens; however, it is not a required element. The term lenticular is applied to the lens body 46 because it includes a large number of tiny lenticular lenses which themselves are named "lenticules." The lenticular lens body is made of any suitable lens material and includes a first surface 62 which carries a plurality of tiny spherical, plano-convex lens elements 70 formed on the surface 62 in any suitable fashion, for example, by a molding process. For convenience, the spherical lens elements or sphericules 70 are formed so that their bases are rectangular, as seen in FIG. 3. In one embodiment of the invention, there are 1600 spherical lenses 70 per square inch.

The lens body 46 also includes an opposed viewing surface 76 which lies in the focal plane of the lenses 70. Each lens 70 thus defines a focal area 70', represented schematically by dash lines, on surface 76 (FIG. 4). In contact with this second surface of the lens body is placed the message carrier 50 which carries a plurality of messages to be displayed. Thus, the messages effectively lie in the focal plane of the lens sphericules. The message carrier includes transparent and opaque regions which are patterned to provide the desired individual messages.

In one suitable arrangement, the message carrier 50 comprises a sheet of photographic film which may be prepared by a photographic process in the manner described in the above-identified patent. Briefly, this method comprises assembling a lamp array and lens system of the type described above in a tubular container identical to container 12 and then separately printing each message on a sheet of photographic film, with each exposure being performed by a different lamp in the lamp array. The resultant film can be used in an operating device 10, or it may be used to print other message carriers, for use in other devices. It is clear that, in a completed operating device, each lamp lights up and displays the message which it caused to be photographed in the manufacturing process. It is also clear that the film 50 may be processed to provide either white on black or black on white messages.

The optical diffusing member 56 is placed over the message film 50 to improve the light contrast in the viewed messages. Such a member may comprise two sheets of synthetic resinous material having contiguous mat surfaces and polished outside surfaces.

Considering the operation of the device 10, each lens element 70 defines a separate focal area 70' on the surface 76 which is the focal plane for the lenses 70. Each lens 70 receives light from all of the lamps 14 in the lamp array, and each lens images each lamp in its focal area or focal plane. Thus, each lens receives light from each lamp and focuses this light as a spot 14' in its focal area 70', with each lamp having its own point of focus in the focal area of each lens. And each lens focuses light from a particular lamp at the same place in its focal area 70', with the focal point 14' of each lamp being determined by the location of the lamp in the lamp array. Thus, the lamp at the upper left-hand corner of the lamp array has its light focused at the lower right-hand corner of the focal area of each lens, and the lamp at the upper right-hand corner of the lamp array has its light focused at the lower left-hand corner of the focal area of each lens, and so forth.

Thus, as each lamp is turned on, a different spot of light is produced in the focal area of each lens. If there are 1600 lens elements per square inch, each lamp produces 1600 spots of light per square inch on surface 76.

With the message film 50 on the surface 76 of lens body 46, the transparent and opaque areas thereof permit some of the focused light spots to be visible to a viewer while some are obstructed, and the pattern of visible and invisible light spots provides the desired visible character or message. As each lamp is turned on, a different set of light spots is produced on surface 76, and a different group of spots and a different message are rendered visible.

In optimum operation of the device 10, as known in the prior art, each lamp 14 could produce only one spot of light in the focal area 70' of each lens element 70. However, this optimum condition was not always achieved, and, when it was not, crosstalk resulted. Crosstalk is the condition that exists when more than one message is visible at the same time. This means that a lamp produces more than one light spot in a focal area at one time. The most important cause of crosstalk up to now has been light rays transmitted through the lens body 46 between adjacent lens elements 70. Such rays appear as auxiliary light spots on the surface 76 and render visible messages which are supposed to be invisible.

According to the present invention, such crosstalk is substantially eliminated by means of opaque members 84 which are placed between and surrounding each lens element at the base of each element at the surface of the lens body. Such opaque members obstruct all possible light paths between the lenses, and only light which properly passes through the lens elements can reach the message film. The opaque elements 84 may be conveniently provided as a unitary structure such as an apertured metal screen or the like, with the lens elements 70 projecting through the apertures in the screen. Such a screen may be conveniently mounted on corner posts 88 formed on the lens body or in any other suitable manner. With such an opaque screen placed on the lens body, only the desired effective light from the lamps passes through the lens elements onto each lens focal area.

What is claimed is:
1. An optical display device including
   a plurality of discrete light sources mounted in close array in a common plane,
   a light transparent body spaced from the light sources and having two opposite faces thereof extending parallel to one another and to said common plane,
   the face of the transparent body confronting the light sources being formed with a multiplicity of like miniature plano-convex lenses protruding therefrom in the direction of the light sources for receiving light therefrom,
   a message carrier layer on the opposite face of said transparent body containing transparencies and opacities in different regions thereof for forming a plurality of images, and
   a unitary structure in the form of a wire screen of opaque crossing members which define open areas substantially identical in size and spatial distribution to said lenses, and means for holding said wire screen as a separate element in physical contact with the confronting face of said transparent body transparent with the lenses protruding through the open area of the screen and with the crossing members of the screen seated at the bases of the lenses in surrounding relation thereto,
   said screen filling the spaces between adjacent lenses at the bases thereof whereby light from any selected one of said light sources passes to said message carrier layer only through the lenses and not through said spaces between said lenses thus preventing passage of spurious light between lenses to eliminate crosstalk.

2. An optical display device including
   a plurality of discrete light sources mounted in close array in a common plane,
   a light transparent body spaced from the light sources and having two opposite faces thereof extending parallel to one another and to said common plane,
   the face of the transparent body confronting the light sources being formed with a multiplicity of like miniature plano-convex lenses protruding therefrom in the direction of the light sources and arranged in an ordered array of rows and columns,
   a message carrier layer on the opposite face of said transparent body containing transparencies and opacities in different regions thereof for forming a plurality of images,
   a lens area in each corner of said confronting face of the transparent body being shaped to form a post dimensionally longer and wider than the lenses, and
   a unitary structure in the form of a wire screen formed of opaque crossing members defining open areas equivalent in size and spatial disposition to the lenses,
   said wire screen being mounted on said corner posts of said confronting face with the lenses protruding through the open areas of the screen and with the crossing members of the screen seated at the bases of the lenses in surrounding relation thereto,
   said screen filling the spaces between adjacent lenses whereby light from any selected one of said light sources passes to said message carrier layer only through the lenses and not through the spaces between the lenses thus preventing passage of spurious light between lenses to eliminate crosstalk.

References Cited

UNITED STATES PATENTS

| | | | |
|---|---|---|---|
| 2,279,825 | 4/1942 | Kaszab | 88—1 |
| 2,876,099 | 3/1959 | Schenk. | |
| 2,981,140 | 4/1961 | Ogle | 88—1 |
| 3,218,924 | 11/1965 | Miller | 88—28.93 |

FOREIGN PATENTS

| | | |
|---|---|---|
| 114,914 | 4/1942 | Australia. |

JEWELL H. PEDERSEN, *Primary Examiner.*

DAVID H. RUBIN, *Examiner.*

J. K. CORBIN, *Assistant Examiner.*

UNITED STATES PATENT OFFICE
CERTIFICATE OF CORRECTION

Patent No. 3,330,614                      July 11, 1967

John Cullis, Jr.

It is certified that error appears in the above identified patent and that said Letters Patent are hereby corrected as shown below:

Column 4, lines 2 and 3, strike out "transparent"; line 4, for "area" read -- areas --.

Signed and sealed this 22nd day of July 1969.

(SEAL)
Attest:

Edward M. Fletcher, Jr.                WILLIAM E. SCHUYLER, JR.
Attesting Officer                        Commissioner of Patents